United States Patent
Rehm

(10) Patent No.: US 9,577,714 B2
(45) Date of Patent: Feb. 21, 2017

(54) WIRELESS RESONANCE COUPLED ENERGY TRANSMISSION

(71) Applicant: Markus Rehm, Villingen-Schwenningen (DE)

(72) Inventor: Markus Rehm, Villingen-Schwenningen (DE)

(*) Notice: Subject to any disclaimer, the term of this patent is extended or adjusted under 35 U.S.C. 154(b) by 489 days.

(21) Appl. No.: 13/999,134

(22) Filed: Jan. 22, 2014

(65) Prior Publication Data

US 2014/0225458 A1 Aug. 14, 2014

(30) Foreign Application Priority Data

Feb. 8, 2013 (DE) .................. 10 2013 002 321

(51) Int. Cl.
| | |
|---|---|
| *H02J 5/00* | (2016.01) |
| *H04B 5/00* | (2006.01) |
| *H02M 1/36* | (2007.01) |
| *H02M 7/48* | (2007.01) |

(52) U.S. Cl.
CPC ............ *H04B 5/0037* (2013.01); *H02J 5/005* (2013.01); *H04B 5/0075* (2013.01); *H02M 1/36* (2013.01); *H02M 2007/4815* (2013.01); *Y02B 70/1441* (2013.01)

(58) Field of Classification Search
CPC ............ H02J 17/00; H02J 50/12; H02J 5/005; H02J 7/0025
USPC .............................................. 320/108
See application file for complete search history.

(56) References Cited

U.S. PATENT DOCUMENTS

| | | | |
|---|---|---|---|
| 6,720,838 B2* | 4/2004 | Locke ................. | H03J 3/04 331/117 R |
| 6,882,236 B2 | 4/2005 | Dinn et al. | |
| 8,854,151 B2* | 10/2014 | Rehm .................. | H04N 3/16 327/177 |
| 2004/0218406 A1* | 11/2004 | Jang .................... | H02J 5/005 363/37 |

(Continued)

FOREIGN PATENT DOCUMENTS

| | | |
|---|---|---|
| JP | 2012 239308 A | 12/2012 |
| WO | WO 2009 091267 A2 | 7/2009 |

OTHER PUBLICATIONS

Wireless Power Transfer System Description, Version 1.1.1, Jul. 2012 From the Wireless Power Consortium (WPC).

(Continued)

*Primary Examiner* — Albert Wong
(74) *Attorney, Agent, or Firm* — Jack Schwartz & Associates, PLLC

(57) ABSTRACT

In a first aspect of the present invention, a wireless power transmission link is proposed, which while substantially maintaining resonant coupling condition (resonance frequency of the source resonant circuit is substantially equal to the resonance frequency of the load resonant circuit) detects a coupling condition of the wireless power transmission link.

In a further aspect of the present invention, a wireless power transmission link is suggested, which while substantially maintaining resonant coupling condition (resonance frequency of the source resonant circuit is substantially equal to the resonance frequency of the load resonance circuit) controlling the operating state of the wireless power transmission link such, that the coupling condition of wireless power transmission link is substantially limited to the critical coupling condition.

20 Claims, 10 Drawing Sheets

(56) References Cited

U.S. PATENT DOCUMENTS

2009/0302933 A1* 12/2009 Boys .................. H03J 5/246
327/553
2012/0043826 A1    2/2012 Saitoh
2012/0161529 A1    6/2012 Kamata
2016/0190816 A1*  6/2016 Rehm .................. H02J 5/005
307/104

OTHER PUBLICATIONS

A Frequency Control Method for Regulating Wireless Power for Implantable Devices, Ping Si, Aigguo Patrick Hu, IEEE Transactions on Biomedical Circuits and Systems, vol. 2 No. 1, Mar. 2008.
Wireless Power Supply for Implantable Biomedical Device Based on Primary Input Voltage Regulation,P.SI, A.P.HU, Industrial Electronics and Applications, 2007. ICIEA 2007.
Inductive Power Transmission Systems With Stabilized Output Voltage Using Local Primary- and Secondary-Side Control, Wambsganss P., Huwig D. 14th International Power Electronics and Motion Control Conference, EPE-PEMC 2010.
Kontaktlose Energieueberbtragung Mobiler Geraete Durch Induktive Nahfeldkopplung, Wambsganss P., Huwig D., Design Elektronik 2010.
European Search Report, European Application No. 14000189.2, dated Oct. 27, 2016.

* cited by examiner

| Headervalue (hex) | Communication message | Communication message length (Bytes) | |
|---|---|---|---|
| 0x01 | identification number | 1 | — 7a |
| 0x02 | communication protocol-identification number | 1 | — 7b |
| 0x03 | power class | 1 | — 7c |
| 0x21 | induktor value (L2) / number of windings (L2) | 2 | — 7d |
| 0x22 | resonance frequency / bandwidth | 2 | — 7e |
| 0x03 / 0x23 | control difference value / trend | 1 / 2 | — 7f |
| 0x06 | standby status / energy coupling status / OCL Flag | 1 | — 7g |
| 0x24 | excluded frequency / bandwidth of excluded frequency | 2 | — 7h |

Fig. 7

WIRELESS RESONANCE COUPLED ENERGY TRANSMISSION

FIELD OF THE INVENTION

The current invention relates to wireless energy transmission by means of inductive or capacitive coupled resonant circuits.

Further, the current invention relates to the control of the resonance frequency, to control the power to be transmitted, and to electrically control the coupling of coupled resonant circuits.

BACKGROUND OF THE INVENTION

Wireless power supply devices can be realized by means of inductive and/or capacitive proximity coupling. This is used in many RFID systems and wireless battery chargers. In this case, a source unit generates an alternating electromagnetic field. This alternating electromagnetic field is coupled through coupled coils (inductive coupling) or by an open capacitor (capacitive coupling) to a load, in the following referred to as a load unit. With increasing distance from the source unit to the load unit decreases the coupling strength and reduces the receivable amount of power at the load unit. In the case of an open capacitor thereby minimizing the coupling capacity, and in the case of coupled coils thereby increasing the leakage inductance. It is known that this effect can be compensated in case of the leakage inductance by a compensation capacitor and in the case of the coupling capacitor by a compensation inductor. This results in at least one resonant circuit at the source unit side and at least one resonant circuit at the load unit side of the power transmission system. These resonant circuits compensate the leakage inductance and coupling capacitance under the condition that the resonant circuits are tuned exactly to the same resonance frequency and the source unit of the power transmission system operates at this resonance frequency. Such coupled resonant circuits are the base of band filters and have been used for many years for e.g. the coupling of amplifier stages etc.

In "Wireless Power Transfer System Description" of the "Wireless Power Consortium (WPC)", a resonant circuit is shown, which is driven by a generator. Here, a plurality of part inductors is selectively used in a resonant circuit in order to concentrate the radiated energy field to the surface where load units are placed. Further, the power supply is controlled by an upstream voltage or current regulator.

The general disadvantage of wireless power principles, based on coupled resonant circuits in the source- and/or load unit, is the resonance frequency detuning due to component tolerances, component aging, coupling and load changes. This detuning effect is undesirable because the impedance of the resonant circuit is frequency selective and a predetermined operation frequency does no longer coincide with the resonant frequency of the circuit. Consequently, the power transmission system operates no longer toward a real load resistance, but also toward an inductive or capacitive component. Thus, the resulting reactive power increases the power dissipation. This lowers the overall efficiency in the source unit (resonant circuit driver stage, etc.) and thus reduces the efficiency of the entire power transmission link. In addition, distortions increase, because the driver circuits generate more harmonics.

The known network sensing method measures the resonance frequency of the network during a time interval and operates the system at this resonance frequency thereafter, but the system has no ability to control the resonance frequency of the resonant circuit or network actively. This would be very desirable, due to guidelines such as EN300330, REC7003 and ITU-RSM2123, which determines maximum power levels over frequency ranges (e.g. 119 . . . 135 kHz).

Furthermore, there exist national specific constraints for narrow frequency ranges within a frequency band that require much lower power level limits. It is therefore important to control not only the power level but also the spectral position of the emitted power.

Another problem relates to the product of the variable coupling (k) and the quality (Q) in the further description referred to as energy coupling (k·Q). The quality factor Q is a measure of the energy stored in the system and the energy transferred by the system, or in other words a measure of the reactive power circulating in the resonant circuit and output power of the resonant circuit. The coupling (k) is essentially determined by the geometry of the wireless coupling link such as distance (area, distance), its angular orientation and the coupling medium. A change in the load resistor in a resonant circuit will also change the energy coupling (k·Q). The system is more or less damped and the energy coupling (k·Q) is consequently smaller or larger. A desired constant output voltage or a desired constant output current of the load unit requires therefore the control of the output power in the source unit by means of a data-load modulation link and/or the control of the output voltage and/or current on the load unit side.

In "A Frequency Control Method for Regulating Wireless Power to Implantable Devices" proposes frequency detuning in the source unit for the output voltage regulation. The problem with this solution is the detuning of the resonance frequency that also simultaneously controls the power of other coupled load units if more than one load unit is used in the wireless power transmission link. An independent control is not possible. Thanks to the performed detuning on the load side, several load units are independently adjustable. However, disadvantageously, the source unit is no longer loaded with a real load resistance in the wireless power transmission link in both variants. The energy transfer is no longer based on coupled resonant circuits and the overall network does not operate in the real domain (resonance case). Consequently, this causes higher losses in the source unit and/or in the load unit.

In "Wireless Power Supply for Implantable Biomedical Device Based on Primary Input Voltage Regulation", the output voltage of the load unit is digitized and transmitted to the source unit. The operating voltage of the source unit is controlled based on the received data of the load unit. This approach is pursued in the standard of "Wireless Power Consortium (WPC)", wherein a wireless power transmission link up to 5 watts is specified. This approach is efficient because only the amount of power is transmitted as needed. Unfortunately resonance detuning is not considered.

Another fundamental problem is not considered in all known systems, and relates to the upper energy coupling boundary value (k·Q=1), wherein the maximum possible power can be transmitted without any substantial frequency detuning or without substantially bandwidth increase. This case is very important because a small coupling factor (k) can be compensated with a higher quality (Q). In this manner, the energy coupling (k·Q) can be held constant. Thus, for example, the power transmission distance can be increased.

In practice, however, often results in a dynamic coupling (time-varying coupling (k)) and/or dynamic load. Examples are different wireless power transmission links with dynamic coupling due to variable geometries, and/or variable distance between the source unit and load unit, and/or modifying the coupling media and especially by altering the load resistance.

It is an essential desire to design a wireless power transmission system as universal as possible and ideally approximating a wired connection as much as possible. This would automatically result in the best efficiency and additionally serve maximal flexibility.

It is further desirable that for a given source unit the operational distance of the power transmission link can be optimized in designing the load unit without any design modifications in the source unit (coils and/or capacitors). E.g., a load unit featured with a small coupling (k) (small coupling surface, etc.) can compensate its limited range with a greater quality factor (Q). This would meet requirements of an open flexible standard, wherein only the basics shall be specified. Additionally, multiple arbitrary load units coupled under changing coupling conditions (changing coupling factors (k) and/or changing qualities (Q)) shall maintain operable in parallel on a source unit.

Further, it should be possible to specify the transmission frequency, as there are radiation limits by law (amplitude and frequency), such as EN300330, REC7003 and ITU-RSM2123.

Further it should be possible to vary the transmission frequency in order to reduce the spectral peak power.

The following invention describes methods and their implementation details that meet the mentioned requirements. The methods described in the following invention and its detail implementations are featured by low-cost implementations, stable operation and high efficiency.

BRIEF DESCRIPTION OF DRAWINGS

FIG. 7 illustrates a package structure or communication protocol according to FIGS. 2 and 3.

DETAILED DESCRIPTION OF THE INVENTION

Figure 1A:
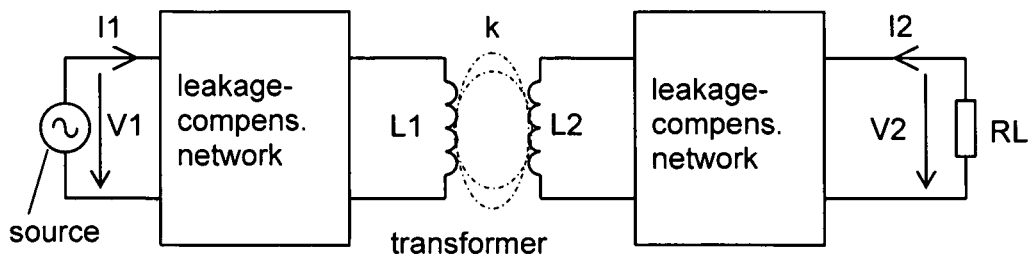
FIGS. 1a ... 1g show basic simplified equivalent circuits of a near field wireless power transmission system using coupled resonant circuits and their transmission properties.

FIG. 1a shows a wireless power transmission system. A source couples energy via two coupled coils L1 and L2 to a load RL. A leakage compensation network is implemented on the source- and load unit side to compensate the leakage inductance.

Figure 1B:
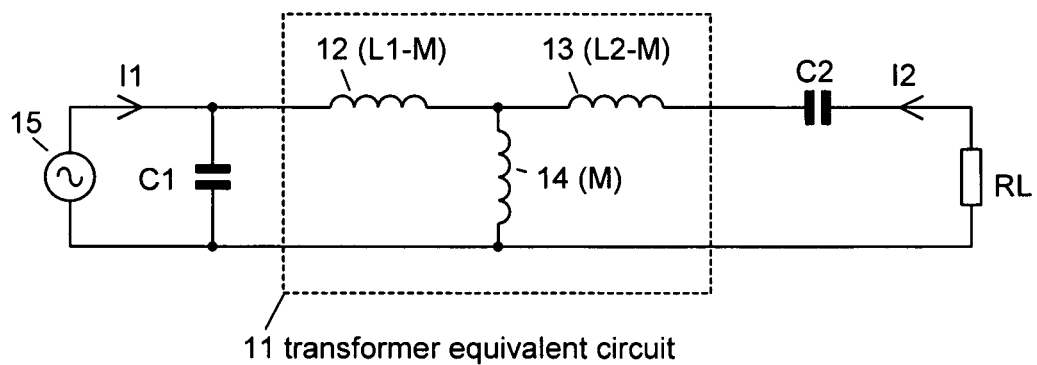

FIG. 1b shows the wireless power transmission link according to FIG. 1a with a simplified transformer equivalent circuit 11 and the capacitors C1 and C2 as leakage compensation. C1 and C2 form together with the primary and secondary inductances L1 and L2 the coupled resonant circuits having substantially the same resonance frequencies. C1 is tuned with L1 to a primary resonance frequency. C2 is tuned with L2 to a secondary resonance frequency. A parallel resonant circuit, formed by C1 and L1 on the primary side and a series resonant circuit formed by C2 and L2 on the secondary side couple a current source I1 to a load resistor RL. The primary leakage inductance 12 with a value of L1-M, the secondary leakage inductance 13 with the value of L2-M and the main inductivity 14 with the value M correspond to the coupled coils. The values M, coupling k, primary inductivity L1 and secondary inductivity L2 are related by the equation $M = k \cdot \sqrt{L1 \cdot L2}$. The secondary quality (Qs) is determined by $$Qs = \frac{\omega \cdot L2}{RL},$$

wherein ω is the angular frequency. As smaller RL is, the greater is Qs.

Figure 1C:
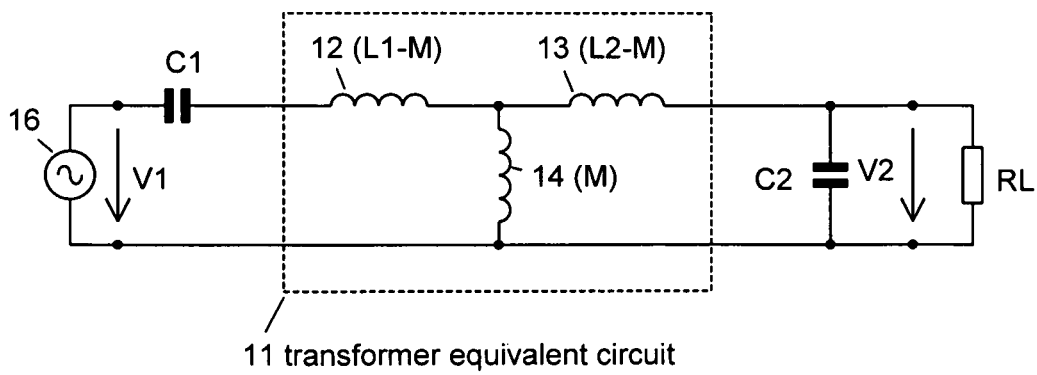

FIG. 1c shows the wireless transmission link according to FIG. 1a with a simplified transformer equivalent circuit 11 and the capacitors C1 and C2 as leakage compensation. C1 and C2 form together with the primary and secondary inductances L1 and L2 the coupled resonant circuits having substantially the same resonant frequencies. C1 is tuned with L1 to a primary resonance frequency. C2 is tuned with L2 to a secondary resonance frequency. A series resonant circuit formed by C1 and L1 on the primary side and a parallel resonant circuit formed by C2 and L2 on the secondary side, coupling a voltage source V1 to a load resistor RL. The value M is determined equal the one shown in FIG. 1b. The secondary quality (Qs) is determined by Qs=RL·ω·C2. As greater RL is, the greater is Qs.

Figure 1D:
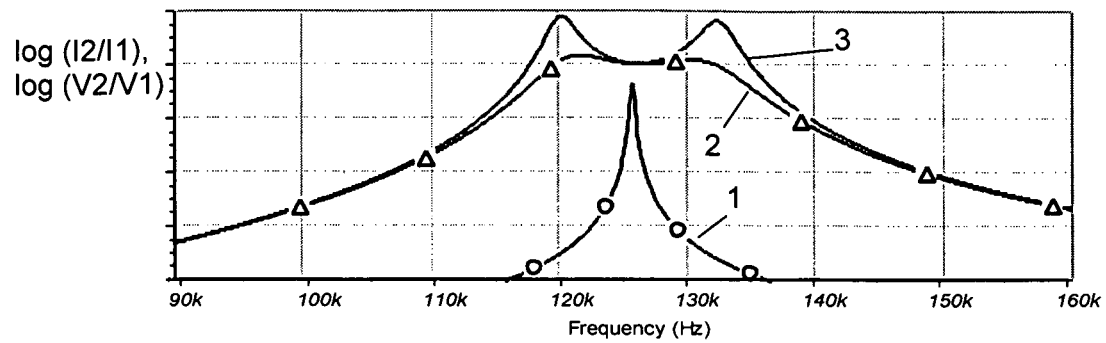
Figure 1E:
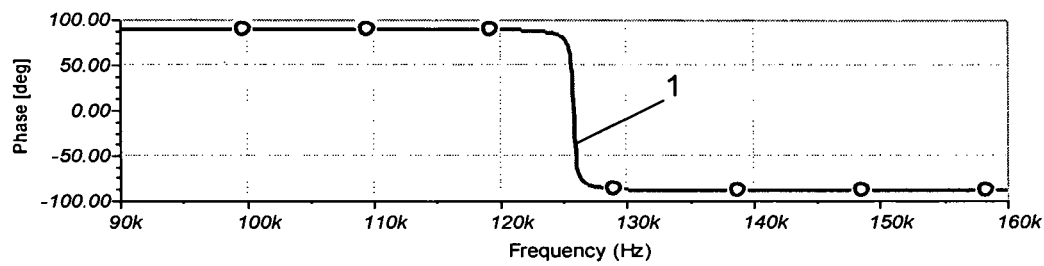

The transmission characteristics of the equivalent circuits of FIGS. 1b and 1c are identical, they differ only in their resonant circuit topologies. These resonant circuit topologies can be combined arbitrarily. E.g., the resonant circuit in the source unit and the resonant circuit in the load unit can have the same topology and can be applied to the described invention as further embodiments. The absolute value of the transfer function I2 versus I1 according to FIG. 1b respectively V2 versus V1 according to FIG. 1c is shown in FIG. 1d. The phase response of the input impedance respectively the input admittance of the wireless power transmission link is shown in FIGS. 1e ... 1g.

Curve 1 shows the transfer characteristics for energy coupling (k·Q) smaller than one. The amount of the transfer function reaches a small maximum value and the phase function has a continuous slope during the phase transition from +90 to −90 degrees (see FIGS. 1d and 1e). This characteristic is called undercritical coupled.

Figure 1F:
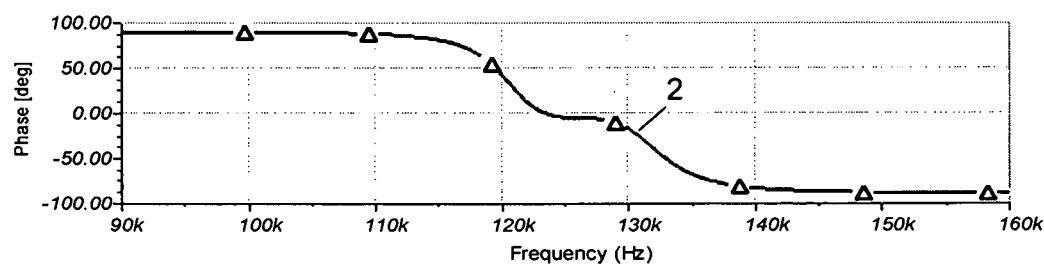

Curve 2 shows the transfer characteristics for energy coupling (k·Q) approximately equal to one. The amount of the transfer function reaches the maximum value without dip and the phase function has a continuous slope with a minor zero gradient range (without changing the pitch sign) within the phase transition from +90 to −90 degrees (see FIGS. 1d and 1*f*). This characteristic is called critically coupled and determines the upper energy coupling boundary value.

Figure 1G:
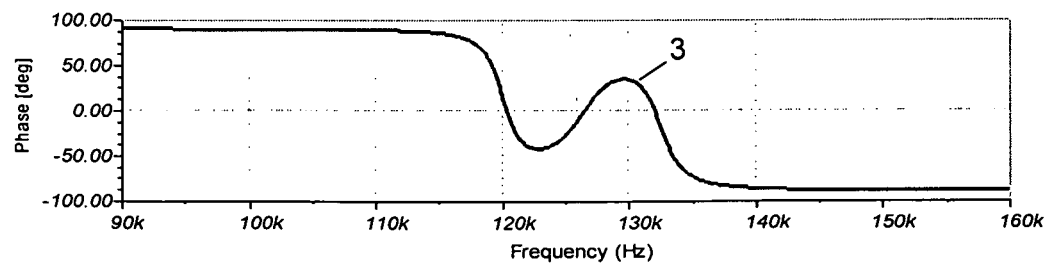

Curve 3 shows the transfer characteristics for energy coupling (k·Q) greater than one. The amount of the transfer function reaches two maximum values and the phase function undergoes a sign change in the slope gradient within the phase transition from +90 to −90 degrees (see FIGS. 1*d* and 1*g*). This characteristic is called overcritical coupled and is avoided in the wireless power transmission link in accordance with a first aspect of the invention. In the topology according to FIG. 1*b*, it is easy to see that the energy coupling (k·Q) increases responsive to a decrease in RL. This corresponds to a load increase which acts toward the power source.

Load coupling by means of a series resonant circuit in the load unit is therefore suitable for a voltage source power supply operation (a desired constant output voltage on the load unit side requires a low source impedance). In fact, a greater load (smaller RL) couples itself tighter to the source unit due to the greater energy coupling. Similar is true for FIG. 1*c*. Here, the energy coupling (k·Q) increases when RL increases. This corresponds to a load increase which acts toward the power source.

Load coupling by means of a parallel resonant circuit in the load unit is therefore suitable for a current source power supply operation (a desired constant output current on the load unit side requires a high source impedance). In fact, a greater load (larger RL) couples itself tighter to the source unit due to the greater energy coupling. Regardless of the resonant circuit topology in the source- and load unit the source unit on the primary side sees a transformed load resistance that damps the resonant network. The resulting overall quality (Qtot) of the wireless transmission path determines the efficiency and frequency selection of the source unit. A high Qtot represents a high frequency selection, large reactive power with respect to output power and therefore a rather lower efficiency. A low Qtot represents a low frequency selection, a small reactive power with respect to output power and therefore a rather higher efficiency.

Figure 2:
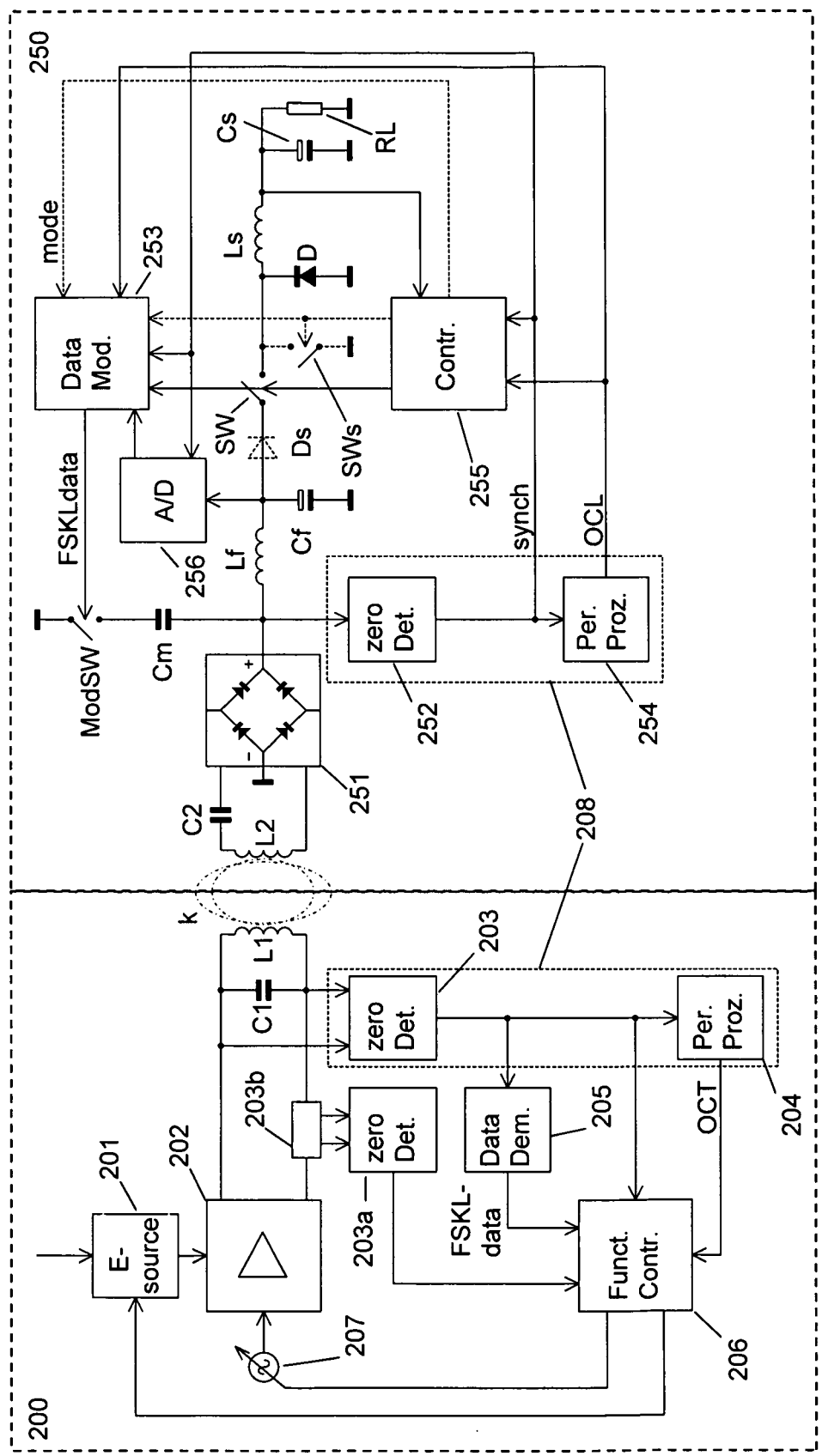
FIG. 2 shows the block diagram of a wireless power transmission system based on resonance coupling according to a first embodiment of the current invention.

FIG. 2 depicts a block diagram of a source unit 200 and a load unit 250 in accordance with a first embodiment of the current invention. An energy source 201 supplies an amplifier 202. 202 drives a parallel resonant circuit formed by L1 and C1. L1 is the primary coil of the wireless power transmission link. A zero- or sign detector 203 generates an output signal indicative of the zero crossing of the resonance voltage.

A zero- or sign detector 203*a* using a current sensor 203*b* generates a signal indicative of the zero crossing of the resonance current. 203 and 203*a* are substantially identical. The output signal of 203*a* supplies a function controller 206. An output signal of 203 is coupled to a data demodulator 205. 205 operates substantially phase- or frequency sensitive and couples demodulated data from the load unit (FSKLdata) to 206. The output signal from 203 is also coupled to block 206 and to a period processor 204.

204 analyzes input signals time- or frequency sensitive and generates in relation to a predetermined comparison value, an output signal (OCT), which in turn serves 206 as an input signal. An output signal of 206 controls the frequency of a generator 207, which drives 202. For that purpose comprises 206 a phase comparator with a subsequent low pass filter.

The phase comparator controls the phase difference of the output signals 203 and 203*a* by means of block 207 to zero (resonance frequency). For example, a phase difference at the output of the phase comparator inside 206 increases or decreases the control voltage, which controls 207. This increases or decreases the frequency of the output signal of 207 until the phase difference reaches again zero (resonance frequency). Another output of 206 controls the output voltage or the output current of block 201. Consequently, the resonant circuit energy respectively the radiated power of the wireless transmission link is controlled.

The secondary coil L2 of the wireless transmission link forms together with C2 a series resonant circuit, which is tuned to fsoll (corresponding to the resonant frequency of L1 and C1).

A rectifier 251 rectifies the resonance voltage and couples it via a low pass filter comprising Lf, Cf to a switch SW. When SW is closed, the load resistance RL is coupled through a storage inductance Ls to the charging capacitor Cf. If SW is open and a current flows in Ls, RL is not coupled with Cf and the diode D forming a freewheel circuit.

The configuration SW, D, Ls, Cs and RL corresponds to a voltage step-down converter. A step-down controller 255 measures the output voltage across RL and generates at its output essentially a pulse width signal (PWM signal) to control SW. For this purpose 255 comprising at least: a voltage reference, a comparator, a step-down loop filter and a PWM generator (not shown). A zero detector 252 signals a sign change in the resonance voltage.

Alternatively, in a further embodiment, the resonance current or the resonance voltage in the resonant circuit L2, C2 is detected (not shown). Exact zero crossing detection is not absolutely necessary, it is essential to obtain accurate phase signals of the oscillating circuit period (or half period). The output signal from 252 serves 255 (the contained PWM generator), an analog/digital converter 256 and a data modulator 253 the synchronization signal. Additionally, the output signal from processor 252 is coupled to a period processor 254. 254, corresponding to 204, analyzes the input signal time- or frequency sensitive and generates in relation to a predetermined comparison value, an output signal (OCL) that controls block 255. One or more output voltages (e.g. the voltage across Cf and/or RL) are in one or more blocks 256 analog to digital converted and then in 253 compared versus a reference value (feedback versus reference comparison). A resulting control difference value is converted in 253 to an appropriate transmission format and along with other data, which are generated and/or stored in 253, coupled as FSKLdata to the ModSW. ModSW modulates by means of Cm the load of 250. FSKLdata is transferred in this manner to 200. Alternatively, as another embodiment, ModSW controls C2 by means of Cm (not shown).

The output voltage control or regulation of the current invention can be carried out in various modes. The modes described below are individually and/or jointly active at different times as a combination in various embodiments. 255 signals the selected mode over the connection mode to block 253. This mode selection signal controls 253, so that the relevant control data (control difference value) of the respective operation mode are transmitted.

In one mode, SW remains for the output voltage regulation always closed or 250 does not include a voltage step down converter (RL is directly connected to Cf). Thus, 256 detects the output voltage across RL. The control difference value (feedback to reference value comparison, i.e. comparison with a first voltage reference value) in FSKLdata corresponds to the output voltage deviation from a desired output voltage across RL. This control difference value is serially transmitted via the wireless coupling link to block 205. 206 uses this data in a standard control function (I, PI or PID) and controls block 201. In this manner the control loop is closed from RL over FSKLdata toward block 201.

In another mode, 250 comprises only SW but no voltage step down converter. The voltage regulation in 250 is implemented by simply interrupting the energy flow (opening SW) in 250 and/or is implemented as described above over the closed loop via the control difference value in FSKLdata and block 206 in 200.

In another mode, SW operates as a PWM controller in the step-down converter for the output voltage regulation in 250. 256 detects the voltage across Cf. The control difference value (feedback to reference value comparison, i.e. comparison with a second voltage reference value) in FSKLdata corresponds to the voltage deviation from a desired voltage across Cf. This control difference value is transmitted together with a duty cycle information of SW (its PWM signal or a digital signal corresponding to the PWM duty cycle of SW) serially over the wireless coupling link to block 205.

206 uses this data in a standard control function (I, PI or PID) and controls block 201. In this manner the control loop is closed from RL over FSKLdata toward block 201. This permits to optimize the efficiency of the wireless power transmission link and yet ensures the operation of several load units 250 on one source unit 200. Additionally, the fast loop response (shortest loop) in the output voltage regulation via SW results in the best dynamic properties.

A larger output voltage control range is obtained when the voltage step-down converter is combined with a voltage step-up converter. This is implemented as a further embodiment of the current invention and is shown in FIG. 2 with the dashed components. For this purpose, a diode D5 is coupled in series with the switch SW, and a second switch SWs placed in parallel to the diode D. Advantageously, D and SWs are combined. In the case 250 operates as a voltage step-down converter (voltage across Cf is higher than the desired output voltage across RL), 255 act as described above. SW defines by its PWM the output voltage and SWs can be left open or SWs closes as a slave according to the status of D.

Operates 250 as a voltage step-up converter (voltage across Cf is lower than the desired output voltage across RL), SW remains closed over 255. Ds prevents the degradation of the higher voltage across RL toward the lower voltage across Cf. SWs operates with a PWM, which determines over its duty cycle the output voltage across RL. The control difference value is taken as in the voltage step-down converter from the voltage value across Cf. This control difference value is transmitted together with a duty cycle information of SWs (its PWM signal or a digital signal corresponding to the PWM duty cycle of SWs) serially over the wireless coupling link to block 205.

206 uses this data in a standard control function (I, PI or PID) and controls block 201. In this manner the control loop is closed from RL over FSKLdata toward block 201. Advantageously, this combined step-up respectively step-down configuration stabilizes the output voltage for both lower and higher received voltages on Cf.

It is also readily apparent that one or more 250 comprise one or more output voltages.

In another mode, the control difference value is derived from a plurality of output voltages, which are sampled in a time multiplex manner and/or be added through resistors. This control difference value is transmitted along with a duty cycle information of one or more switches SW (their PWM signals or a digital signal corresponding to the PWM duty ratios of a plurality of switches) serially over the wireless coupling link to block 205. 206 uses this data in a standard control function (I, PI or PID) and controls block 201. In this manner the control loop is closed from RL over FSKLdata toward block 201.

If a plurality of 250 operate with one 200, 206 combines multiple control difference values of a plurality of received FSKLdata of coupled 250 and controls 201. In this way, the total radiated power of 200 is adjusted to the overall power level required to supply a plurality of 250. The fine output voltage regulation within the individual 250 is controlled by SW and/or SWs.

It is also possible to operate one or more 250 with continuously closed SW together with one or more 250, which use SW and/or SWs as output voltage regulator on one 200.

These output voltage control or regulation methods respectively their different modes correspond to the normal operating mode (continuous operation), while OCL is not active. For this case, the period comparison versus a predetermined reference value generates inside 250 a first result, which resets OCL to OFF (see FIG. 4). This corresponds to the operating condition during the energy coupling condition characteristic for curve 1 in FIGS. 1*c* and 1*d*.

A further increases in the energy coupling (higher coupling k and/or larger load) results in critical- and finally overcritical coupling condition. The input impedance develops a plurality of different resonant frequencies (every zero crossing of the phase line of the input impedance). This causes in the control loop 202, 203, 203*a*, 203*b*, 206 and 207 a phase jitter around to the resonance frequency at critical coupling condition, which in excess leads to a superposition of two current or voltage curves at overcritical coupling condition. This state is defined here as over coupling and defines an unwanted operation status. The state change from critical toward overcritical coupling condition arises fluently in practice.

In practice, it is sufficient to detect the state of overcritical coupling explicitly for the energy coupling control of the wireless power transmission link. Depending on the implementation of the functions described in the following, 204 respectively 254 responses faster (even at critical coupling condition) or responses slower (not until overcritical coupling condition). 254 in 250 compares the half period of the detected zero-crossings versus a predetermined comparison value, which is a little less than the half period of the operation frequency in undercritical coupling condition. This comparison now yields a second result, which changes the state of OCL to ON (high potential).

In one embodiment, the period processor compares multiple of detected half periods versus almost the same value corresponding to the same multiple of half periods of the operating frequency in undercritical coupling condition. The response of the coupling detector 254 increases accordingly.

The ON in OCL forces 254 to generate an output signal, which opens SW as long as OCL is ON. The function of the voltage step-down converter is disabled and RL is decoupled from Cf. OCL remains ON even if the output of 252 indicating normal energy coupling conditions (detected half period is greater than the predetermined comparison value).

As a consequence, the lower load reduces the energy coupling. After an arbitrary time (TL) where 250 remains unloaded (RL is decoupled from Cf), the output of 254 changes independently (e.g. by means of an implemented one shot circuit or timer), OCL goes to OFF and RL restores coupling with Cf by closing SW (see FIG. 4). The step-down converter restores normal operation.

When k and RL remain unchanged, the overcritical coupling condition reestablishes as soon as, the system reaches the steady state condition in Lf and Cf. SW reopens via OCL for the time interval TL, then closes again etc.

Consequently, the coupling status of RL with Cf alters continuously. The average value of the effective RL appearing in the energy coupling reaches in this manner the value which is substantially equal to the boundary value of RL defining the critical coupling condition. This represents a limitation of the energy coupling to a maximum of one. Since 254 is responsive to one or a few half-periods and TL is much longer, the operation status during which the wireless power transmission link operates in the overcritical coupled condition reduces to a minimum or is prevented completely. Thereby, the entire power transmission link operates in the source- and load unit substantially continuously under resonant condition, i.e. at the resonance frequency. This resonance frequency is determined by 200 and 250.

Advantageously this results in the smallest possible bandwidth. Additionally, the entire power transmission link operates always under matched conditions because always only the real part of the entire transmission path changes. A resonance frequency detuning is always readjusted in 200. The effective real load resistance of 200 is determined by RL, the turn ratio of L1 and L2, the window function (duty cycle) of the signal OCL and the energy coupling (k·Q). Thus, the wireless power transmission link directly corresponds to an RL (eventually transformed by L1/L2) contacted at 200 and thus corresponds to a wired coupling. By choosing TL and selecting the components of the filter Lf and Cf, the ON/OFF timing of OCL can be designed flexibly. An abrupt coupling respectively abrupt decoupling of RL has no adverse impact on 200, since Lf and Cf act as a filter, which smoothing any appearing load transients on 200.

In 200 occurs something similar. If an overcoupling condition is detected in 204, OCT sets to ON, 206 disables 201 or reduces the output power of 201 to a minimum value for a time interval TT. The time response of OCT is delayed by TD versus OCL. After the time interval TT has elapsed, the output of 204 changes independently (e.g. by means of an implemented one shot circuit or timer), OCT goes to OFF and 201 is again enabled or restored to normal output power (see FIG. 4). If overcoupling condition is redetected, the process repeats: 201 again disables delayed by TD or reduces the output power and automatically reestablishes normal operation after the interval TT. In this manner a safe operation and a soft start at 200 is guaranteed whenever overcoupling condition occurs.

In one embodiment of the current invention, 204 is featured with a delayed time response versus the time response of 254 concerning the start of TD, for an appearing overcoupling condition.

In another embodiment, 204 and 254 are featured with an identical response time (same or similar implementation), then the required delay in the start of TD is implemented in 206 as a delay on the event OCT. Operationally, both versions are identical. TD ensures that the energy coupling control is always first executed at 250. Advantageously, other 250, which are coupled to 200 remain continuously supplied with energy due to the continuous operation of 200. TT within 200 and TL within 250 need not to be equal. The redundancy of the double implementation of 208 within 200 and 250 limit, in any case, the energy coupling (k·Q) substantially to the value one. This comprises also a possible malfunction in 250: Then, the other block 208 reacts as soon as overcoupling condition has established.

A source unit can also radiate energy in a predetermined frequency range. Further, a load unit can drive a load as a regulated current source. This is illustrated in the block diagram in FIG. 3. The source unit 300 comprises a large signal VCO 301, which is powered with the necessary operating voltage by a controlled power source 302.

The term large signal VCO stands for an oscillator whose active element 304 (amplifier) operates mainly as a switch. Further, the frequency of this oscillator is controlled by a current or a voltage. Advantageously, the frequency controller comprises at least one coupling switch, which couples at least one inductor or at least one capacitor via a variable coupling interval to the resonant circuit, wherein the coupling interval is smaller than a period of the resonant circuit.

The inverting amplifier 304 drives a series resonant circuit comprising the electrically controlled capacitor C1 and the primary coil L1 of the wireless power transmission link. An inverter 303 closes a feedback loop to the input of 304 and provides a continuous current- and voltage oscillation in the resonant circuit (positive feedback).

Figure 3:
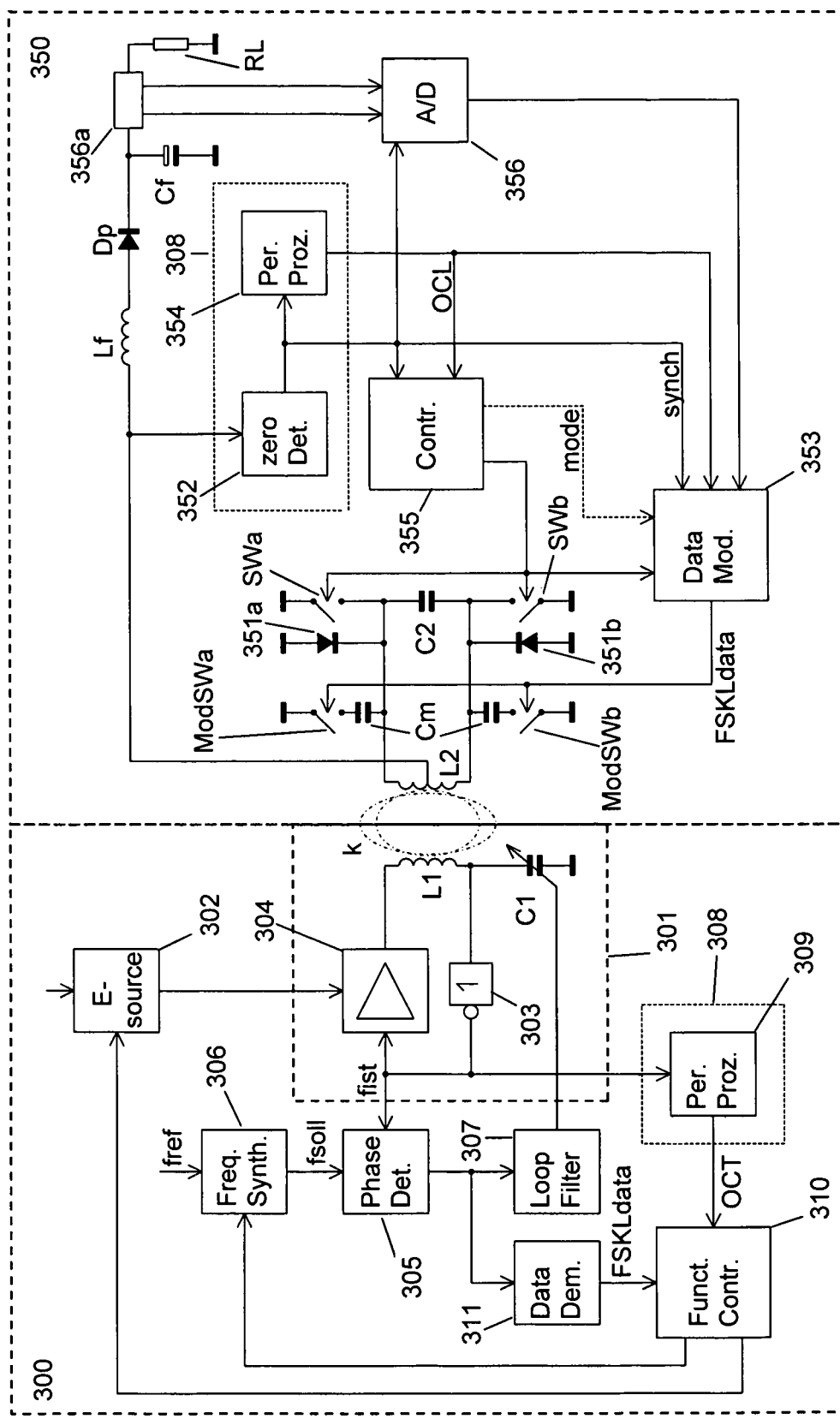
FIG. 3 shows the block diagram of an wireless power transmission system based on resonance coupling according to a second embodiment of the current invention.

In a further embodiment of the present invention, the large signal VCO is equipped with an H-bridge or push-pull stage and is implemented with a parallel resonant circuit (not shown in FIG. 3). The functions of all the properties described (PLL operation and control loops) remain the same as for the large signal VCO driving the series resonant circuit.

The oscillator signal (output signal first of 303) is compared in a phase comparator 305 versus a reference value (fsoll). fsoll is generated in a frequency synthesizer 306 using a fundamental frequency (fref). The output signal from 305 is filtered by a loop filter 307 and subsequently coupled as a control factor to the variable capacitor C1. When 301 does not oscillates at fsoll, 305 generates an error output signal, which retunes C1 after filtering with 307 until first becomes equal to fsoll.

In this manner 300 emits electromagnetic energy, which is regulated in the frequency at fsoll. Any kind of frequency detuning such as by component tolerances, component aging or changes in the load unit 350 are corrected within a few dozen oscillator periods. The coupling detector 308 comprises the period processor 309, because the zero-crossing- or sign detector essentially corresponds to 303. An output signal of 305 is coupled to a data demodulator 311.

Alternatively, in another embodiment, 311 uses first as its input signal. 311 operates substantially phase or frequency sensitive and couples demodulated data from the load unit (FSKLdata) to a function controller 310. The output signal of 303 is coupled to a period processor 309. 309 analyzes the input signals time- or frequency sensitive and generates in relation to a predetermined comparison value, an output signal (OCT), which in turn serves 310 as an input signal. An output signal of 310 controls 306 and defines in this manner fsoll.

For this purpose comprises 306 mainly a programmable frequency divider. In one embodiment of the actual invention the frequency divider within 306 changes its divisor as a function of time to form an arbitrary frequency spectrum (e.g. approximated rectangular spectrum or Sin(x)/x, etc.) in fsoll and accordingly in the radiated field. Another output of 310 controls the output voltage or the output current of 302.

The secondary coil L2 of the wireless power transmission link forms together with C2 a parallel resonant circuit, which is tuned to fsoll (corresponding to the resonance frequency of C1 and L1). If fsoll is changed over time, the resonance frequency of L2 and C2 is selected so that it substantially matches the center of the frequency range, which in turn is radiated by 300.

A rectifier 351a, 351b rectifies the resonance voltage and couples it through a low pass filter LF and a diode Dp to a filter capacitor Cf and the load RL. Parallel to 351a and 351b are each a switch SWa and SWb connected. Advantageously, 351a and SWa respectively 351b and SWb are integrated into each one component. If SWa and SWb are open, RL is coupled via 351a during one half resonant circuit period and via 351b during the other half resonant circuit period over Lf to the resonant circuit L2, C2.

Are SWa and SWb once closed at the same time, the resonant circuit is shunted by SWa and SWb, Dp blocks and RL is no longer coupled with the resonant circuit L2, C2. The configuration SWa, SWb, C2, L2, Lf and Dp operate as a shunt regulator for RL. An analog- to digital converter 356 measures by means of a current sensor 356a the load current through RL. 355 generates responsive to the output signal of 356 essentially a pulse width signal (PWM signal) and controls SWa and SWb. For this purpose comprises 355 at least: a voltage or current reference, a comparator, a loop filter and a PWM generator (not shown). A zero-crossing detector 352 signals a sign change in the resonance voltage. Alternatively, in a further embodiment, the resonance current or the resonance voltage in the resonant circuit L2, C2 is detected (not shown). The output signal from 352 synchronizes block 355 (the contained PWM generator), block 356 and the data modulator 353. In addition, the output of 352 is also coupled to a period processor 354. 354 corresponding to 309 analyzes the input signals time- or frequency sensitive and generates in relation to a predetermined comparison value, an output signal (OCL) that controls block 355.

The output value of 356 is compared in 353 with a reference value (feedback versus reference comparison). A resulting control difference value is converted in 353 to an appropriate transmission format and along with other data, which are generated and/or stored in 353 coupled as FSKLdata to ModSWa and ModSWb. ModSWa and ModSWb modulate Cm with the load of 350. FSKLdata is transmitted in this manner to 300.

Alternatively, in a further embodiment, Cm is coupled at the tapping of L2 via a ModSW to ground.

The output current control or regulation of the current invention can be carried out in various modes. The modes described below are individually and/or jointly active at different times as a combination in various embodiments. 355 signals the selected mode over the connection mode to 353. This mode selection signal controls 353, so that the relevant control data (control difference value) of the respective operation mode are transmitted.

In one mode, SWa and SWb remain for the output current regulation open. Thus, 356 detects the output current in RL. The control difference value (feedback to reference value comparison, i.e. comparison with a first reference value) in FSKLdata corresponds to the output current deviation from a desired output current through RL. This control difference value is serially transmitted via the wireless coupling link to block 311. 310 uses this data in a standard control function (I, PI or PID) and controls block 302. In this manner the control loop is closed from RL over FSKLdata toward block 302.

In another mode, SWa and SWb operate as a PWM controller for the output current regulation in 350. 356 detects the current through RL. The control difference value (feedback to reference value comparison, i.e. comparison with a second reference value) in FSKLdata corresponds to the current deviation from a desired current through RL. This control difference value is transmitted together with a duty cycle information of the switches SWa respectively SWb (its PWM signal or a digital signals corresponding to the PWM duty cycle of SWa respectively SWb) serially over the wireless coupling link to 311. 310 uses this data in a standard control function (I, PI or PID) and controls block 302. In this manner the control loop is closed from RL over FSKLdata toward block 302. This permits to optimize the efficiency of the wireless power transmission link and yet ensures the operation of several load units 350 at one source unit 300. Additionally, the fast loop response (shortest loop) in the output current regulation by means of SWa respectively SWb results in the best dynamic properties. It is also readily apparent that one or more 350 may comprise one or more output currents.

In another mode, the control difference value is derived from a plurality of output currents, which are sampled in a time multiplexed manner and/or are simply added. This control difference value is transmitted along with a duty cycle information of one or more switches SWa respectively SWb (their PWM signals or a digital signal corresponding to the PWM duty ratios of a plurality of switches) serially over the wireless coupling link to block 311. 310 uses this data in a standard control function (I, PI or PID) and controls block 302. In this manner the control loop is closed from RL over FSKLdata toward block 302.

If a plurality of 350 operate with one 300, 310 combines multiple control difference values of a plurality of received FSKLdata of coupled 350 and controls 302. In this way, the total radiated power of 300 is adjusted to the overall power level required to supply a plurality of 350. The fine output current regulation within the individual 350 is controlled by SWa respectively SWb.

It is also possible to operate one or more 350 with continuously open SWa respectively SWb together with one or more 350, which use SWa and SWb as output current regulator on one 200.

These output current control methods respectively their different modes correspond to the normal operating mode (continuous operation), while OCL is not active. For this case, the period comparison versus a predetermined reference value generates inside 350 a first result, which resets OCL to OFF (see FIG. 4). This corresponds to the operating condition during the energy coupling condition characteristic for curve 1 in FIGS. 1c and 1d. A further increase in the energy coupling (higher coupling k and/or larger load) results in critical and finally overcritical coupling condition. The input impedance develops a plurality of different resonant frequencies (every zero crossing of the phase line of the input impedance). This causes in the control loop 301 phase jitter around the resonance frequency at critical coupling condition, which in excess leads to a superposition of two current or voltage curves at overcritical coupling condition. This state is defined here as over coupling and defines an unwanted operation status. The state change from critical- toward overcritical coupling condition arises fluently in practice. In practice, it is sufficient to detect the state of overcritical coupling explicitly for the energy coupling control of wireless power transmission link. Depending on the implementation of the functions described in the following, 309 respectively 354 responses faster (even at critical coupling condition) or responses slower (not until overcritical coupling condition). 354 in 350 compares the half period of the detected zero-crossings versus a predetermined comparison value, which is a little less than the half period of the operating frequency in undercritical coupling condition. This comparison now yields a second result, which changes the state of OCL to ON (high potential).

In one embodiment, the period processor compares multiple of detected half periods versus almost the same value corresponding to the same multiple of half periods of the operation frequency in undercritical coupling condition. The response of the coupling detector 354 increases accordingly. The ON in OCL forces 354 to generate an output signal, which closes SWa and SWb as long as OCL is ON. Consequently, RL is decoupled from C2, L2 by Dp. OCL remains ON even if the output of 352 indicating normal energy coupling conditions (detected half period is greater than the predetermined comparison value).

As a consequence, the lower load reduces the energy coupling. After an arbitrarily time (TL) where 350 remains unloaded (RL is decoupled from C2), the output of 354 changes independently (e.g. by means of an implemented one-shot circuit or timer), OCL goes to OFF and RL restores coupling with C2, L2 by opening SWa and SWb (see FIG. 4). The rectifier 351a, 351b restores normal operation.

When k and RL remain unchanged, the overcritical coupling condition reestablishes as soon as the system reaches the steady state condition in Lf and Cf. SWa and SWb close again via OCL for the time interval TL, then open again, etc. Consequently, the coupling status of RL with C2, L2 alters continuously. The average value of the effective RL appearing in the energy coupling reaches in this manner the value which is substantially equal to the boundary value of RL defining the critical coupling condition. This represents a limitation of the energy coupling to a maximum of one.

Since 354 is responsive to one or a few half-periods and TL is much longer, the operation status during which the wireless power transmission link operates in the overcritical coupled condition reduces to a minimum or is prevented completely. Thereby, the entire power transmission link operates in the source- and load unit substantially continuously under resonant condition, i.e. at the resonance frequency. This resonance frequency is determined by 300 and 350. Advantageously this results in the smallest possible bandwidth. Additionally, the entire power transmission link operates always under matched conditions because always only the real part of the transmission path changes. A resonance frequency detuning is always readjusted in 300. The effective real load resistance of 300 is determined by RL, the turn ratio of L1 and L2, the window function (duty cycle) of the signal OCL and the energy coupling (k·Q).

Thus, the wireless power transmission link directly corresponds to an RL (eventually transformed by L1/L2) contacted at 300 and thus corresponds to a wired coupling. By choosing TL and selecting the components of the filter Lf and Cf, the ON/OFF timing of OCL can be designed flexibly. An abrupt coupling respectively abrupt decoupling of RL has no adverse impact on 300, since Lf and Cf act as a filter, which smoothing any appearing load transients on 300.

In 300 occurs something similar. If an overcoupling condition is detected in 309, OCT sets to ON, 310 disables 302 or reduces the output power of 302 to a minimum value for a time interval TT. 350 is no longer supplied with energy. The time response of OCT is delayed by TD versus OCL. After the time interval TT has elapsed, the output 309 changes independently (e.g. by means of an implemented one shot circuit or timer), OCT goes to OFF and 302 is again enabled or restored to normal output power (see FIG. 4). If overcoupling condition is redetected, the process repeats: 302 again disables delayed by TD or reduces the output power and automatically reestablishes normal operation after the interval TT. In this manner, a safe operation and a soft start at 300 is guaranteed whenever overcoupling condition occurs.

In one embodiment of the current invention, 309 is featured with a delayed time response versus the time response of 354 concerning the start of TD, for an appearing overcoupling condition.

In another embodiment, 309 and 354 are featured with an identical response time (same or similar implementation), then the required delay in the start of TD is implemented in 310 as a delay on the event OCT. Operationally, both versions are identical. TD ensures that the energy coupling control is always executed at 350. Advantageously, other 350, which are coupled to 300 remain continuously supplied with energy due to the continuous operation of 300.

TT within 300 and TL within 350 need not to be equal. The redundancy of the double implementation of 308 within 300 and 350 limit, in any case, the energy coupling (k·Q) substantially to the value one. This comprises also a possible malfunction in 350: Then, the other block 308 reacts as soon as overcoupling condition has established.

In one embodiment of the current invention, 310 changes the resonance frequency in 300 responsive to 306 and 305. This represents another variant to reduce the energy coupling. In this manner, advantageously, the coupling k and/or the quality factor Q of 350 and above all the amplitude of 301 change. This may be sufficient to inhibit the overcoupling condition. Thus, 300 features an additional degree of freedom versus 200 by arbitrarily controlling the resonance frequency. This resonance frequency change occurs alone or combined with a control of 302.

Advantageously, the described methods of the different modes of 200, 250, 300 and 350 of FIGS. 2 and 3 serve greatest flexibility. Each 250 and 350 may determine itself the method by which the output voltage respectively the output current should be regulated. The control difference value, which is transmitted in FSKLdata describes a measure as to whether more or less power over the wireless transmission link from 200 respectively 300 is to be pushed to 250 respectively 350.

In another embodiment of the current invention are, in the event of overcoupling condition, only individual partial loads, i.e. a number of output voltages of a plurality of output voltages in 250 respectively a number of output currents of a plurality of output currents in 350, successively decoupled via a plurality of switches (SW), or diodes (DP) within 250 respectively 350. In this manner, other partial loads of 250 respectively 350 remain continuously supplied with energy.

In general, the energy coupling limitation of the current invention limits the load energy or power. Depending on the implementation of the functions and operating modes described, an output voltage across RL respectively an output current through RL may more or less drop. Thanks to the existing energy storages (Ls, Cs within 250 respectively Lf, Cf within 350), the output voltage respectively the output current might not interrupt necessarily. All modes of the described methods may interoperate with each other and the pairing of any one or more 250 respectively 350 with one 200 respectively 300 can be permuted arbitrarily. Advantageously, TL respectively TT is elected by factors greater than the lock time of the PLL loop 202, 203, 203a, 203b, 206, and 207 respectively 301, 305 and 307.

Figure 5:
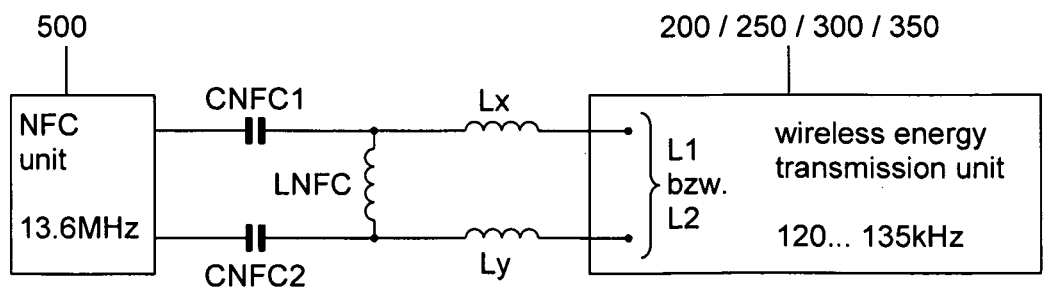
FIG. 5 shows an universal embodiment of one coupling inductance used in two main applications according to the current invention.

FIG. 5 shows a typical flexible implementation according to one embodiment of the current invention: A transmitting and/or receiving coupling coil (LNFC) which is used in two different frequency ranges at the same time and/or at different times in two different main applications.

The first main application is an RFID or Near Field Communication (NFC) by inductively coupled inductors and operates in a first frequency range above 1 Hz (e.g., 6.78 MHz or 13.56 MHz). The capacitors CNFC1 and CNFC2 tune LNFC to the first frequency range and/or match LNFC to the input or output of the processing unit 500 of the first main application. In addition, CNFC1 and CNFC2 decouple an operating status of the first main application from an operating status such as transmission or reception of the second main application.

Additionally, in a further embodiment of the invention, switch or amplitude limitation means (e.g. diodes) are implemented to protect the input- or output stage within 500 from overvoltage (not shown in FIG. 5). E.g. limiting diodes connected to a reference potential are used for that purpose. The switches are implemented in series and/or at least one switch to a reference potential.

The second main application is a wireless power transmission, and operates in a second frequency band below 1 MHz (for example, 120 . . . 135 kHz). The coils Lx and Ly tune LNFC to the second frequency range and/or match LNFC to the input or output of the processing unit 200/250/300/350 of the second main application. In addition, Lx and Ly decouple an operating status such as transmission or reception of the second main application from an operating status of the first main application. The processing unit 200/300/250/350 corresponds to one or multiple blocks in FIG. 2 respectively FIG. 3, wherein the multiple blocks might be operational at different times. In one embodiment of the actual invention the second main application operates as a transmitter and emits power by means of LNFC.

In another embodiment of the current invention, the second main application operates as a receiver and receives power by means of LNFC. Advantageously, 250 operates in the second main application as a voltage step-up converter, since the induced voltage due to the low inductance of LNFC is relatively small (in the range 4 uH . . . 20 uH) and the decoupling inductances Lx and Ly are rather large (in the range 30 . . . 100 uH).

If a plurality of 250 or 350 operate on one 200 or 300, the communication of the individual FSKLdata may be disturbed. For this reason, the individual FSKLdata are transmitted in periodic- or random time division multiplex. As a consequence, ModSW remains open or closed if no FSKLdata are transmitted.

Figure 6A:
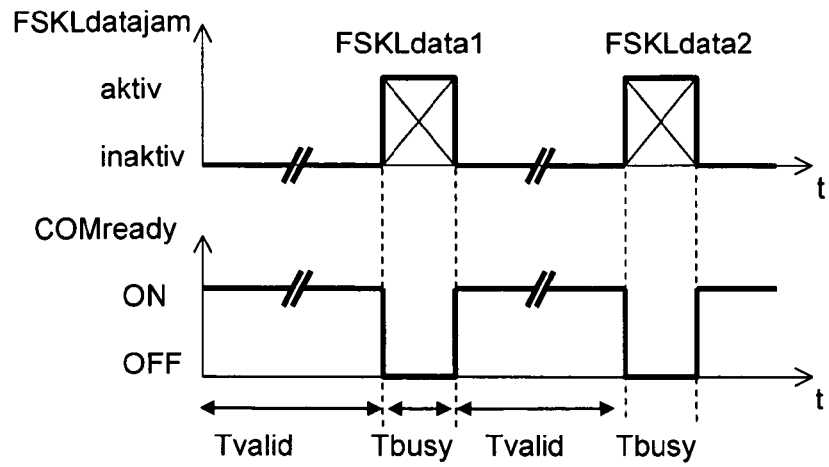
FIGS. 6A and 6B show waveforms and a block diagram of a communication controller according to FIGS. 2 and 3.

FIG. 6a shows two at different times transmitted FSKLdata1 and FSKLdata2, whereby these data might be generated from the same or two different 250 or 350. During the time intervals Tbusy no further FSKLdata can be sent because the channel is busy (the channel busy indicator FSKLdatajam is active). 253 and 353 comprise for this purpose a communication detector 601, which signals Tbusy (see FIG. 6b). The input signal of block 601 serves by synch. Synch is analyzed within 601 in a time and/or frequency sensitive manner and generates at its output a binary signal COMready, which is OFF in the case of Tbusy active, otherwise set to ON.

The communication trigger 602 generates a positive output pulse COM in a periodic or random manner having the length of FSKLdata, wherein the pulse is only generated during Tvalid. This pulse signals the communication controller 603 to generate a serial bitstream of FSKLdata (or at least portions thereof) by means of the clock COMclk and couples it to ModSW. COMclk is derived from synch by a frequency divider 604. In this manner, advantageously, FSKLdata are always sent synchronously versus the resonant circuit periods. This simplifies 205 and 311 and provides good reception sensitivity.

FSKLdata transmits binary information, which is differentially encoded in two phases at a bitrate whose clock is divided from synch. The binary information is formatted in byte length. The communication protocol FSKLdata comprises data formatted in a header (constant bit length), the message (variable bit length), and a checksum (constant bit length).

The header defines the message portion of the following message and its length in bytes. E.g. the lower 4 bits of the header defines the message portion and the upper 4 bits defines the message length (see FIG. 7). In this case, one or more message portions can vary in their length (e.g. control variable in FIG. 7f). The message transmits the message portion, which was previously signaled in the header. The checksum transmits a CRC- or hash value calculated over the message portion or alternatively also calculated over the message including the header.

In a first message portion at least one identification number which is pre-stored in 250 or 350 is transmitted (see FIG. 7a).

In a further embodiment of the current invention, an identification number is generated for a time interval (e.g. duration of energy transmission session).

In another message portion, an identification number is transmitted (see FIG. 7b), which characterizes a communication protocol version of the message (header/message portion encoding according to the pattern as shown in FIG. 7 or similar).

In another message portion, at least one value characterizing power or characterizing a power class is transmitted (see FIG. 7c).

In a further message portion, at least one value of a secondary receiver inductor (L2) and/or the number of windings of L2 is transmitted (see FIG. 7d).

In a further message portion, at least one value of a resonance frequency and/or a reception bandwidth is transmitted (see FIG. 7e).

In another message portion, at least a control difference value or a control trend is transmitted (see FIG. 7f).

In another message portion, at least a value of a coupling status or an energy coupling status (OCL flag) and/or a operation status is transmitted (see FIG. 7g). The OCL flag is a bit that is set by the OCL signal at 253 respectively 353. In another message portion, at least a value of a not allowed frequency range (i.e. an excluded transmission frequency or bandwidth) is transmitted (see FIG. 7h).

200 or 300 reads these values and adjusts operation mode conditions according to the received message or message portion.

Thus, in one embodiment of the current invention, at least one or more message portions of the received message are processed according to the received protocol identification.

In another embodiment, 201 respectively 302 is controlled in the output power responsive to the control difference value, and if necessary limited in the output power responsive to the power class and/or to the inductor L2 and/or to the number of turns of L2. E.g. reaches a control difference value a predetermined value, then the radiated power is limited or reduced until the received control difference value does no longer indicate the predetermined value. This guarantees overdrive protection of all 250 and 350.

Additionally, as an option, 201 respectively 302 is enabled respectively disabled (continuous energy transmission respectively no energy transmission) or continuously switched between these two operation states (burst mode) responsive to the received operation status and/or the received energy coupling status (OCL flag) information in FSKLdata.

In a further embodiment, 306 is controlled in fsoll such that the radiated power at a predetermined resonant frequency or over a frequency bandwidth, under consideration of a not allowed frequency or frequency range, is in accordance with a predetermined value or at least approximates the predetermined value.

In a further embodiment, 310 is controlled such that the emitted electromagnetic power is disabled or at least the emitted power is limited within a frequency range responsive to a specific identification numbers. In this manner, the power flow to individual 250 or 350 is controlled, or the power flow enables respectively disables responsive to an identification number.

Figure 8:
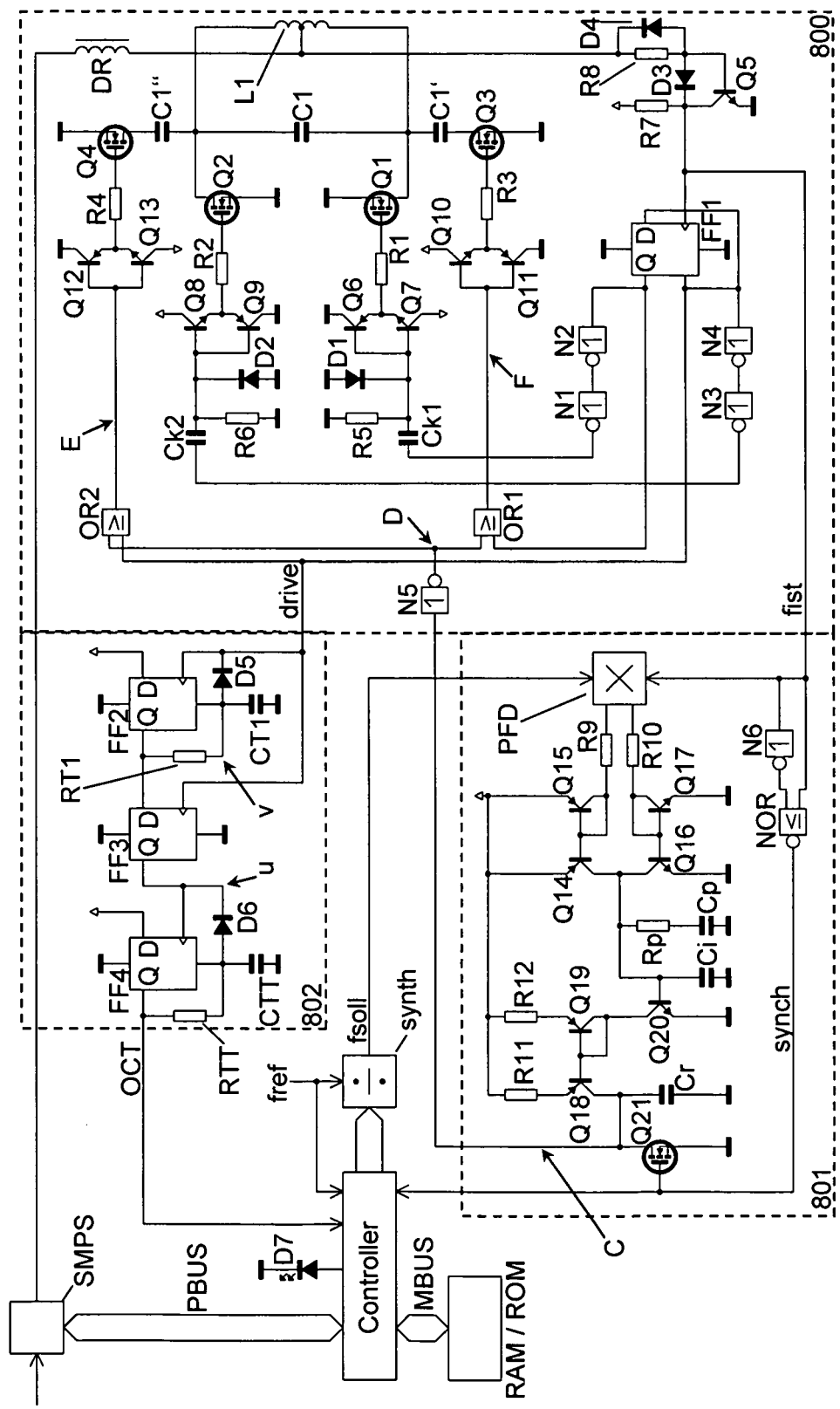
FIG. 8 shows a detailed circuit according to the current invention.
Figure 9B:
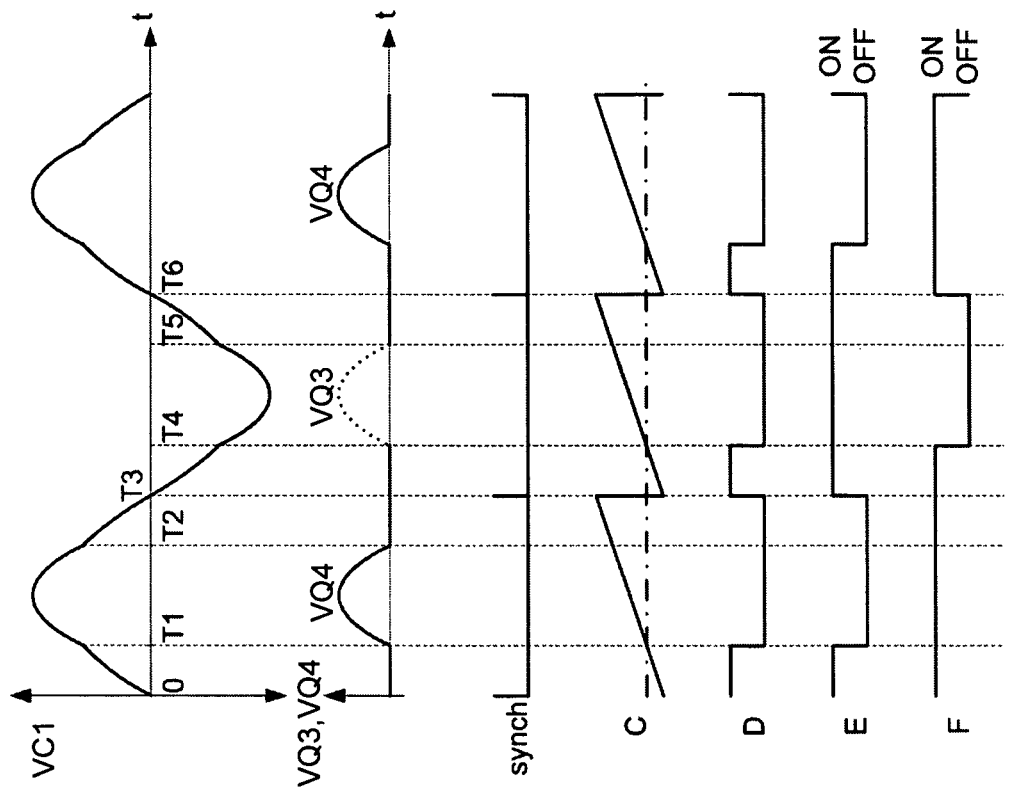
FIGS. 9A and 9B show waveforms according to the FIG. 8.
Figure 9A:
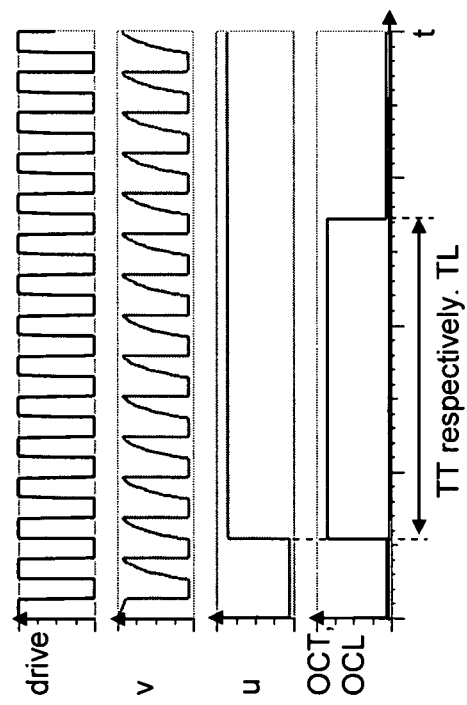

FIG. 8 shows an example of a detailed circuit according to 300 in FIG. 3. FIGS. 9*a* and 9*b* show signal waveforms, which are referred to in the further description. A large signal VCO, here a parallel push-pull circuit with Q1 and Q2 drives the parallel resonant circuit comprising L1, C1. DR energizes the center tap of L1 by a controllable power supply SMPS. Advantageously, the voltage across L1 in this resonant circuit topology is independent of the quality of the resonant circuit and is a related over a constant with the supply voltage at the output of the SMPS. R8, D3 and D4 switch Q5 always conductive, except during the voltage zero crossings of the resonant circuit voltage.

The voltage across R7 clocks the D flip-flop FF1, which operates as a frequency divider. The output signals are delay by N1 . . . N4 and further coupled in an AC manner via CK1, CK2, D1, D2, R5 and R6 to Q6 . . . Q9. Q6 . . . Q9 drive Q1 and Q2 by means of R1 and R2. The output signal first of Q5 is also coupled to the input of the phase comparator PFD of block 801, which compares first versus fsoll. 801 corresponds substantially to 305 and 307.

The charge pump R9, R10, Q14, Q15, Q16 and Q17 generates in the PLL loop filter Ci, Cp and Rp, an error voltage corresponding to the phase difference between first and fsoll. This error voltage generates with the current in Q18 . . . Q20 a ramp voltage across Cr, that is modified by repeating short conducting of Q21 to a sawtooth voltage (waveform C). first is formed by NOR and N6 into short time pulses now named as synch that control Q21 and synchronize the FSKLdata demodulation in the controller (signal curve synch).

This sawtooth voltage alters the state of N5, as soon as its threshold voltage is reached (see T1, T3, T4, T6 intersections with the dotted line curve C and output D). The following OR 1 and OR2 rout the timing signal D to the corresponding coupling switches Q3 respectively Q4 to control the resulting value of capacitor C1 in a large signal manner. The driving signals of FF1 are inverse to each other and change their state at 0, T3, and T6. In this manner, only every second period of D is routed to E respectively F. The driver Q10 . . . Q13 switch Q3 respectively Q4 accordingly via R3 and R4. As a consequence, across Q3 respectively Q4 develops alternately a half sine wave per period (see waveform VQ3 dashed respectively VQ4). R1 . . . R4 have a low value and prevent transients in the switch control. Q3 and Q4 closing during the interval T2, T3 (Q4) and the interval T5, T6 (Q3) independently through their internal diodes as soon as C1' respectively C1" has discharged.

This phase control of the effective parallel capacitance of C1' and C1" provides a control range of C1tot=C1+0.5·C1', if C1'=C1" is. In this manner is first always perfectly adjusted to fsoll. fref is divided by the programmable divider to obtain synth. Delays N1 . . . N4 compensate the propagation delay of first to D and ensure the full control range in C1tot. One output of FF1 is coupled to the clock inputs of FF2 and FF3. With the rising edge FF2 is set and after reaching the threshold over CT1 reset. RT1 and CT1 define the time constant (predetermined reference value).

When signal curve v reaches the threshold of the reset input of FF2, then is always only a "OFF" latched to the output of FF3 (see waveform u). If the threshold value at the reset input of FF2 is not reached (because drive operates at a too high frequency), then a "ON" is latched to the output of FF3. This situation is achieved after the second drive period in FIG. 9*a*, since drive in this example has such a high frequency that v never reaches the threshold (continuous over-coupling).

D5 ensures the reset of the voltage across CT1. The mono stable flip-flop FF4, RTT and CTT generate a high (ON) in OCT when u remains set for more than one drive period. After a time interval (TT) has elapsed, the voltage across CTT reaches the threshold, which resets FF4. OCT is coupled to the controller, if necessary, internally in the controller additionally delayed, and then used over PBUS to control the SMPS. A signal responsive to OCT is signaling the energy coupling status visually by means of D7 (over coupling indicator).

The controller comprises the divider synth and also the FSKLdata demodulator. For this purpose, the frequency deviation is measured by a cycle counter over a temporal profile. The received FSKLdata control the SMPS and/or synth, and optionally further optical indicators (not shown in FIG. 8). For this purpose, the controller comprises a microcontroller with RAM and ROM memory and/or a PLD/FPGA and/or ASIC components. These implementation methods are known to a person skilled in the art.

Figure 10:
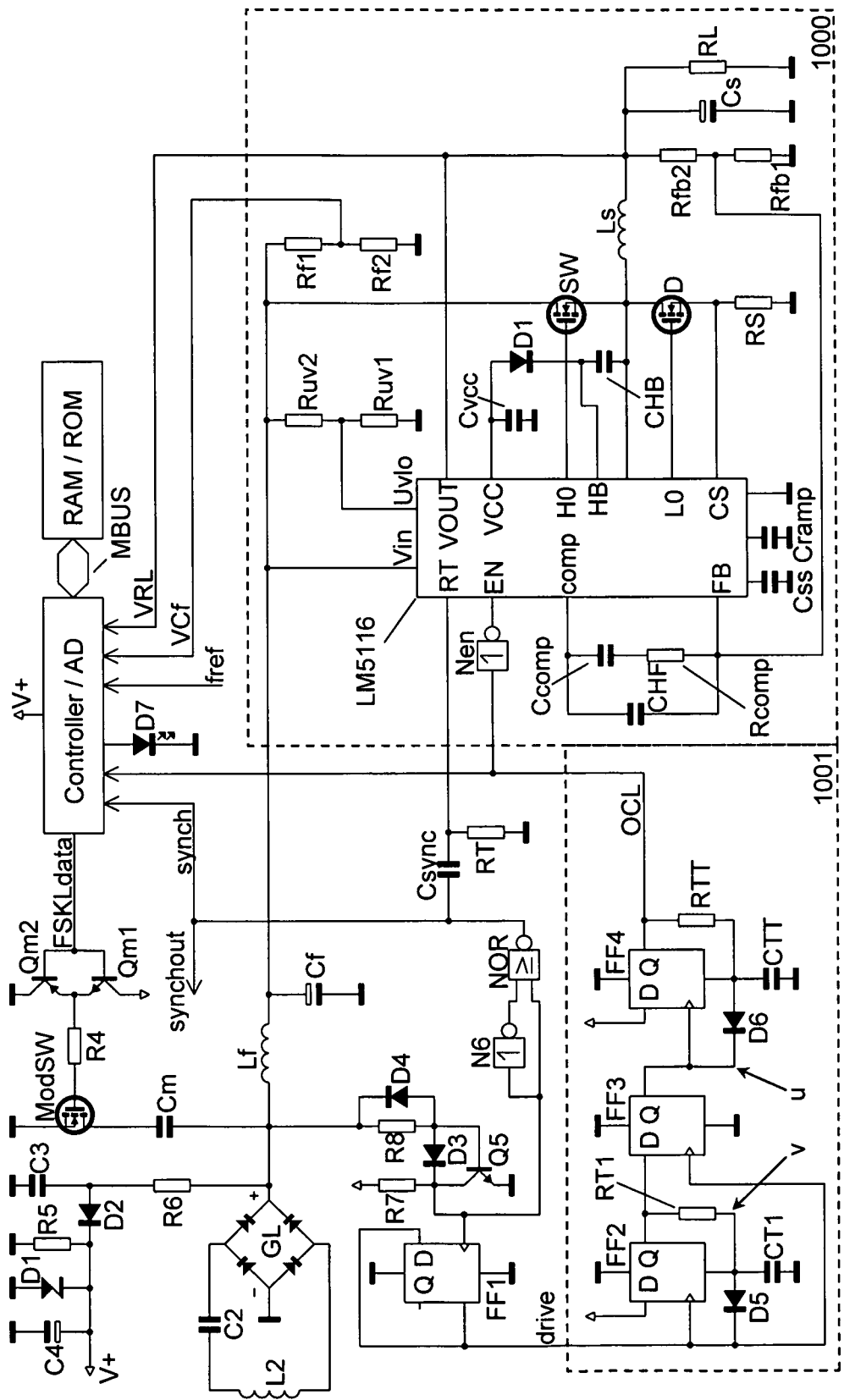
FIG. 10 shows a further detailed circuit according to the current invention.

FIG. 10 shows the detailed circuit of a receiver 250 of a wireless power transmission system according to FIG. 2. L2 form together with C2 a series resonant circuit for receiving the electromagnetic field lines. GL rectifies the received signal and couples it after filtering with Lf and Cf to SW within 1000. This block corresponds to a voltage step-down converter and represents a typical implementation of LM5116 by an excerpt of its data sheet. D is implemented as a switch and LS, Cs are storage elements. The exact detail function of LM5116 and its components shown here is referred to the data sheet. The operation mode of LM5116 is carried out in diode emulation mode, or alternatively in the synchronous mode. Rfb1 and Rfb2 couple the output voltage across RL in a voltage divider manner to the feedback input FB. The switching frequency of the PWM generator inside LM5116 is here directly synchronized with the electromagnetic field. For this purpose, R8, D3 and D4 keep Q5 conducting, except during the minima of the rectified resonant circuit voltage. N6 and NOR form the voltage across R7 into short pulses, which control over Csync and RT the RT input of LM5116. This synchronizes the internal PWM and switching frequency of 1000 with the received electromagnetic alternating field received at L2, C2. Advantageously, 1000 discharges the resonant circuit L2, C2 (filtered by LF, Cf) on a resonant circuit half-period base and the energy charging respectively the energy discharging of the resonant circuit L2, C2 substantially coincide. This reduces the required capacitor size and currents in Cf versus the unsynchronized case with the same filter properties. As a consequence, the cost reduces and the reliability increases.

In addition, the NOR output (synch) is coupled to the synchronization input of the Controller/AD. The voltage across R7 is frequency divided in FF1 and thereafter analyzed in 1001 whether overcoupling condition has developed or not. 1001 corresponds to 802, and hence the waveforms of FIG. 9 are valid. The output signal of 1001 (OCL) is inverted by Nen and coupled to the EN input of LM5116. If overcoupling condition is detected (OCL is at high level), thus SW opens and the voltage down converter interrupts the energy flow from Cf to RL.

Figure 4:
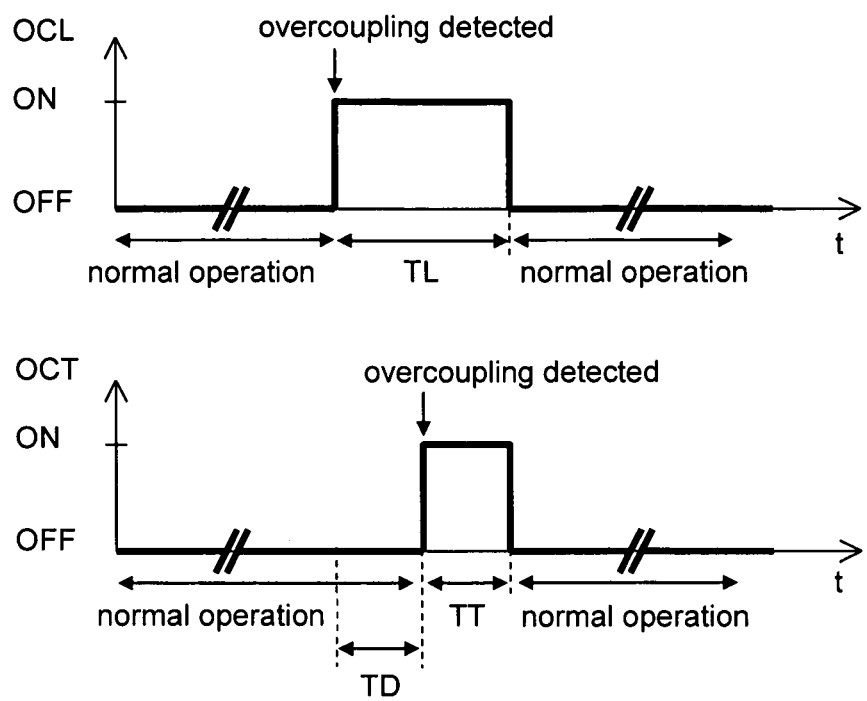
FIG. 4 shows waveforms of output signals of over coupling detectors in accordance with FIGS. 2 and 3.

OCL is processed together with other values that shall be transmitted within the Controller. Here refer to OCT and Controller in FIG. 8. The Controller shown in FIG. 8 features an additional time response delay for the operational behavior with the load unit in FIG. 10. By means of this delay, the resulting OCT appears always after OCL (see FIG. 4). The timing of OCT and OCL in the overall wireless power transmission procedure is indicated in FIG. 4.

The timing shown in FIG. 9a represents a quantitative illustration of 1001.

In another embodiment of the current invention, 1001 is eliminated in FIG. 10. Here, the signal OCL is directly determined in the Controller/AD by counting fref clock cycles within one synch period. For this case, the Controller according to FIG. 8 can be featured with a smaller or no additional delay.

In FIG. 10, the output voltage across RL, and the voltage across Cf by means of an additional voltage divider RF1 and RF2, coupled to the Controller/AD. The existing analog-digital converter (AD) within Controller converts these input values into a digital format.

These data are coupled in the above described manner (protocol formation and redundancy addition), and after adding other values (see FIG. 7) as FSKLdata via the drivers and R4 to ModSW. ModSW sets Cm while numbers of resonant circuit periods corresponding to the bit rate, to ground, and modifies in this manner the capacitance of C2.

Figure 6B:
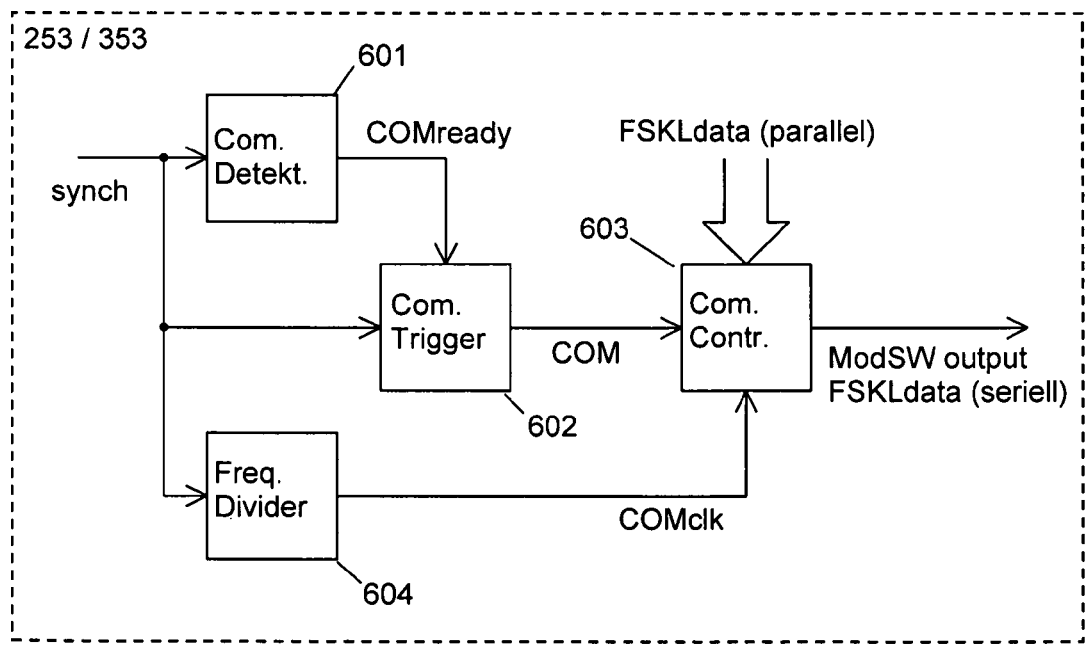

The bit rate is down divided from synch in the Controller/AD of FIG. 6b. In the case the Controller/AD is implemented as sequential program (software), then the implementation of FIG. 6b is slightly different. It is important that the data rate (bit rate) is synchronized with synch and a possible transfer conflict (FSKLdatajam) is avoided. For this purpose, the Controller/AD detects period- or frequency changes of the signal synch and any received FSKLdata of other load units by means of reference frequency.

Alternatively, in an embodiment of the present invention any other FSKLdata are demodulated (e.g. at least a portion of FIG. 7) and shown to the user. The Controller/AD requires beside data processing means internal A/D converters, RAM and ROM memory, and their coupling means (MBUS) to the controller. The processing frequency (clock) is fref or alternatively multiple factors of synch. R6 and C3 eliminate or reduce voltage transients at the output of GL (snubber). The resulting energy is dissipated across a resistor, or alternatively, as shown here, used as an additional voltage V+ (e.g. for the Controller/AD). For this purpose charges D2 C4 and D1 limits V+. Alternatively, a coil is coupled in series to D2 (not shown). In this manner, the load unit comprises always a minor base load. Further, this base load is also determined by Ruv1, Ruv2, Rf1, Rf 2 and the base load of LM5116.

It is obvious for a person skilled in the art that various described methods and/or modes of FIGS. 2, 3, 8 and 10 comprise or include digital signal processing. This is implemented in a discrete or integrated manner, as a programmable logic device (PLD, FPGA), and/or as piece of hardware or software within a microcontroller. Furthermore various numbers of sub-blocks within the FIGS. 2, 3, 8 and 10 can be integrated in integrated circuits (ASICs).

In one embodiment of the current invention, synch is served as a reference frequency for other communication means, such as e.g. NFC, RFID, Bluetooth, WLAN, UWB, etc. (see output synchout in FIG. 10). For this purpose synch is multiplied by means of a PLL to an integer number, and thereafter used to control a data rate (bit rate) or to define and synchronize the transmission frequency and/or a communication time window (communication time slot) of a time multiplex transmission and/or to control a random code sequence of a code division multiplex system (frequency hopping FH, a direct sequence method).

The invention claimed is:

1. A wireless electrical power transmission system based on nearfield coupled resonant circuits between a source unit and at least one load comprising:
   at least one first capacitor and at least one first inductor forming at least one first resonant circuit in said source unit for emitting electrical power,
   at least one second capacitor and at least one second inductor forming at least one a second resonant circuit, a resonance frequency of said at least one second resonant circuit being substantially equal to a resonant frequency of said at least one first resonant circuit, for receiving at least a part of the electrical power emitted by said at least one first resonant circuit and for delivering the at least a part of the electrical power to said at least one load,
   at least one detector for detecting a coupling condition of said at least one first and second resonant circuits, and
   at least one controller for controlling power transmission between said source unit and said at least one load, wherein said power transmission is at least one of interrupted, minimized and continued at a different emitted frequency, responsive to at least one of a detected critical- and overcritical coupling condition of said at least one first- and second resonant circuits.

2. A wireless electrical power transmission system according to claim 1, further comprising:
   at least one power control loop for controlling the transmitted power from said source unit to said at least one load when said at least one of said critical and overcritical coupling condition is not detected.

3. A wireless electrical power transmission system according to claim 1, wherein a detector is responsive to a period or frequency of at least one of said at least one first and second resonant circuits to detect at least one of said critical and overcritical coupling condition.

4. A wireless electrical power transmission system according to claim 1, further comprising:
   a frequency generator control loop for driving said at least one first resonant circuit at its resonance frequency.

5. A wireless electrical power transmission system according to claim 1, further comprising:
   at least one third inductor or at least one third capacitor for controlling the resonance frequency of said at least one first resonant circuit, wherein said third inductor or said third capacitor is coupled to said at least one first resonant circuit by at least one switch for a controllable coupling interval, said controllable coupling interval being smaller than a voltage or current period in said at least one first resonant circuit.

6. A wireless electrical power transmission system according to claim 5, wherein said at least one third inductor or at least one third capacitor for controlling the resonance frequency of said at least one first resonant circuit is part of a large signal VCO included in a phase control loop for controlling a frequency of said emitted electrical power.

7. A method to control power transmission over an electrical wireless power transmission link based on a nearfield coupled resonant circuits comprising at least one first and at least one second resonant circuit which have substantially a same resonance frequency, said method comprising:
 a) transmitting power from a source unit to at least one load via said nearfield coupled resonant circuits,
 b) detecting at least one coupling condition of said wireless power transmission link, wherein said transmitted power is responsive to at least one of a detected critical- and overcritical coupling condition, and at least one of;
 c1) disables said transmitting power,
 c2) minimizes said transmitting power, and
 c3) continues said transmitting power at a different transmission frequency.

8. The method according to claim 7, further comprising:
 d) controlling said transmitting power from said source unit to said at least one load by a power control loop.

9. The method according to claim 7, wherein said detecting includes:
 generating said at least one of a detected critical- and overcritical coupling condition responsive to a period or frequency of at least one of said at least one first and second resonant circuits.

10. The method according to claim 7, further comprising:
 e) resonance detecting a resonance frequency of at least one of said at least one first and second resonant circuits, and
 f) driving said at least one of said at least one first and second resonant circuits at a resonance frequency responsive to said resonance detecting.

11. The method according to claim 7, further comprising:
 g) coupling of at least one of an additional inductor or capacitor to at least one of said at least one first and second resonant circuits for a variable coupling interval, the variable coupling interval being smaller than a voltage- or current period in said resonant circuit.

12. The method according to claim 11, further comprising:
 h) controlling the frequency of said wireless power transmission link by retuning said variable coupling interval in a large signal VCO which is part of a phase control loop.

13. The method according to claim 7, wherein said detecting is executed at least twice independently with at least two different time responses.

14. A wireless electrical power transmission system according to claim 1, further comprising:
 at least two detectors for detecting a coupling condition of said at least one first and second resonant circuits, wherein said at least two detectors have different response times for detecting a coupling condition of said at least one first and second resonant circuits.

15. A wireless electrical power transmission system based on nearfield coupled resonant circuits comprising:
 at least one first resonant circuit coupled to at least one second resonant circuit for transmitting power from at least one source to at least one load, wherein a resonance frequency of said first resonant circuit is substantially equal to a resonance frequency of said second resonant circuit,
 at least one detector for detecting a coupling condition of said at least one first and second resonant circuits, and
 at least one controller for controlling the power transmission between said at least one source and said at least one load, wherein said power transmission is at least one of interrupted, minimized and continued at a different emitted frequency, responsive to at least one of a detected critical and overcritical coupling.

16. The wireless electrical power transmission system according to claim 15, further comprising:
 a frequency control loop for driving a least one of said at least one first and second resonant circuits at its resonance frequency.

17. The wireless electrical power transmission system according to claim 15, further comprising:
 at least one resonance frequency control loop for controlling the resonance frequency of at least one of said at least one first and second resonant circuits, wherein at least a part of electrical power in said wireless electrical power transmission system is transmitted at said resonance frequency of said at least one of said at least one first and second resonant circuits.

18. The wireless electrical power transmission system according to claim 17, wherein said at least one resonance frequency control loop comprises:
 at least one third inductor or at least one third capacitor for controlling the resonance frequency of at least one of said at least one first and second resonant circuits, wherein said third inductor or said third capacitor is coupled to at least one of said at least one first and second resonant circuits by at least one switch for a controllable coupling interval which is smaller than a voltage- or current period in at least one of said first and second resonant circuits.

19. The wireless electrical power transmission system according to claim 15, wherein a detector is responsive to a period or frequency of at least one of said at least one first and second resonant circuits to detect at least one of said critical- and overcritical coupling condition.

20. A wireless electrical power transmission system according to claim 15, further comprising:
 at least two detectors for detecting a coupling condition of said at least one first and second resonant circuits, wherein said at least two detectors have different response times for detecting a coupling condition of said at least one first and second resonant circuits.

* * * * *